United States Patent [19]

Okamoto

[11] Patent Number: 4,499,166
[45] Date of Patent: Feb. 12, 1985

[54] METHOD OF DEVELOPING AN ELECTROSTATIC LATENT IMAGE USES MAGNETIC DEVELOPER

[75] Inventor: Yoshikazu Okamoto, Tokyo, Japan

[73] Assignee: Rank Xerox, Ltd., London, England

[21] Appl. No.: 273,283

[22] Filed: Jun. 15, 1981

[30] Foreign Application Priority Data

Jun. 16, 1980 [JP] Japan ................................. 55-80314

[51] Int. Cl.³ ............................................. G03G 13/09
[52] U.S. Cl. ....................................... 430/33; 430/122
[58] Field of Search .................... 430/108, 106.6, 122, 430/109; 252/62.54, 62.53

[56] References Cited

U.S. PATENT DOCUMENTS 2,890,968  6/1959  Giaimo, Jr. ..................... 430/106.6

Primary Examiner—John D. Welsh
Attorney, Agent, or Firm—H. Fleischer; J. E. Beck; R. Zibelli

[57] ABSTRACT

A developer mixture used in an electrophotographic printing machine to develop an electrostatic latent image recorded on the photoconductive member includes weakly magnetically attractable toner particles and strongly magnetically attractable carrier granules adhering triboelectrically to one another. The toner particles and carrier granules are substantially the same size. During development, the toner particles are deposited on the latent image forming a toner powder image. Subsequently, the toner powder image is transferred to a copy sheet and permanently fixed thereto.

4 Claims, 3 Drawing Figures

METHOD OF DEVELOPING AN ELECTROSTATIC LATENT IMAGE USES MAGNETIC DEVELOPER

The present invention relates generally to an electrophotographic printing machine, and more particularly concerns an improved developer mixture for use in the development system of the electrophotographic printing machine.

Generally, an electrophotographic printing machine includes a photoconductive member which is charged to a substantially uniform potential to sensitize the surface thereof. The charged portion of the photoconductive surface is exposed to a light image of an original document being reproduced. This records an electrostatic latent image on the photoconductive member corresponding to the informational areas contained within the original document. After the electrostatic latent image is recorded on the photoconductive member, a developer mixture is brought into contact therewith. This forms a powder image on the photoconductive member which is subsequently transferred to a copy sheet. Finally, the copy sheet is heated to permanently affix the powder image thereto in image configuration.

It is well known that a typical method of development employing a two component developer mixture comprising non-magnetic toner particles and magnetic carrier granules has problems. Frequently, the image becomes poor due to the deterioration of the carrier granules, and the image becomes unstable due to the change in the ratio of toner particles to carrier granules in the developer mixture.

With the advent of single component methods of developing, i.e. the usage only of magnetic toner particles, an attempt has been made to solve the foregoing problems. However, single component developer materials do not optimize both development and transfer.

Recently, a method has been devised which lies between single component and two component developer mixtures. In this technique, nonmagnetic toner particles, used in the conventional two component method, and magnetic toner particles, used in the single component method, are mixed to form a developer mixture. The single component magnetic toner particles function as the carrier. With this developer mixture, an image of high density may be obtained. Furthermore, deterioration of the carrier granules is reduced and image stability improved. Even if the electrostatic latent image is developed by the carrier granules or the carrier granules are transfered to the copy sheet, satisfactory copies are obtained. Although the size of each of the magnetic toner particles acting as carrier granules is substantially the same size as each of the toner particles, this does not pose a problem during the copying process. However, it has been found that a magnetic brush development system using this developer mixture does not have a smooth flow of developer material when compared with conventional magnetic carrier granules having a larger size than the toner particles. This produces unevenness in developing of low density areas and developer material accumulates in the developing area. In order to improve transportability and developability, the magnet inside of the developing roller is rotated at high speeds. However, this results in additional difficulties in that not only does the developer material accumulate at the developing area, but also the drive source required to rotate the magnet at high speed develops eddy currents. The generation of eddy currents reduces the expected life of the developer mixture. The following disclosures appear to be relevant to the foregoing types of developer mixtures:

British Pat. No. 944,396, Patentee: Kalle Aktiengesellschaft, Published: Dec. 11, 1963;

U.S. Pat. No. 4,235,194, Patentee: Wada et al., Issued: Nov. 25, 1980;

U.S. Pat. No. 4,239,845 Patentee: Tanaka et al. Issued: Dec. 16, 1980;

The pertinent portions of the foregoing disclosures may be briefly summarized as follows:

Kalle describes two non-magnetic toner particles having opposite polarities and being of the same size.

Both Wada et al. and Tanaka et al. describe a developer mixture comprising non-magnetic toner particles and magnetic toner particles. Both the non-magnetic toner particles and magnetic toner particles are of substantially the same size.

In accordance with one aspect of the features of the present invention, there is provided a developer mixture including magnetically attractable toner particles and magnetically attractable carrier granules. The toner particles and carrier granules are of substantially the same size and adhere triboelectrically to one another. The carrier granules are more strongly magnetically attractable than the toner particles.

Pursuant to another aspect of the features of the present invention, there is provided a method of electrophotographic printing including the steps of recording an electrostatic latent image on a photoconductive member. A developer mixture support is moved to transport at least a portion of a developer mixture comprising at least magnetically attractable toner particles and magnetically attractable carrier granules to the latent image. The toner particles and carrier granules adhere triboelectrically to one another with the carrier granules being more strongly magnetically attractable than the toner particles. The toner particles and carrier granules are of substantially the same size. An electrical bias is applied to the developer mixture support so that the toner particles deposit on the latent image forming a toner powder image thereon.

In accordance with still another aspect of the features of the present invention, there is provided a method of developing an electrostatic latent image including the steps of mixing magnetically attractable carrier granules with magnetically attractable toner particles so that the toner particles and carrier granules adhere triboelectrically to one another to form a developer mixture. The carrier granules and toner particles are of substantially the same size with the carrier granules being more strongly magnetically attractable than the toner particles. The developer mixture support moves to transport at least a portion of the developer mixture into contact with the latent image. An electrical bias is applied to the developer mixture so that toner particles deposit on the latent image forming a toner powder image thereon.

Other aspects of the present invention will become apparent as the following description proceeds and upon reference to the drawings, in which.

While the present invention will hereinafter be described in connection with a preferred embodiment and methods of use thereof, it will be understood that it is not intended to limit the invention to that embodiment or methods of use. On the contrary, it is intended to cover all alternatives, modifications and equivalents as may be included within the spirit and scope of the invention as defined by the appended claims.

Figure 1:
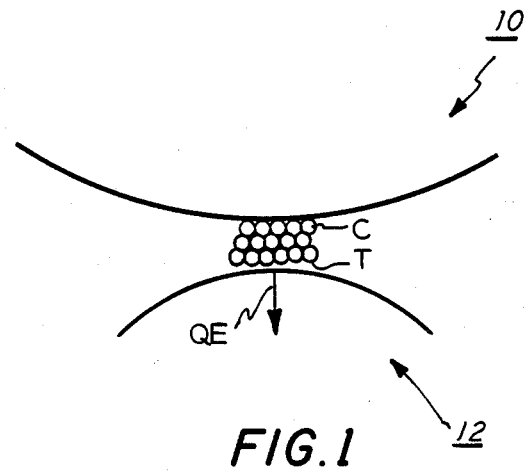
FIG. 1 is a schematic elevational view showing the effect of an electrical field on the developer mixture of the present invention.
Figure 2:
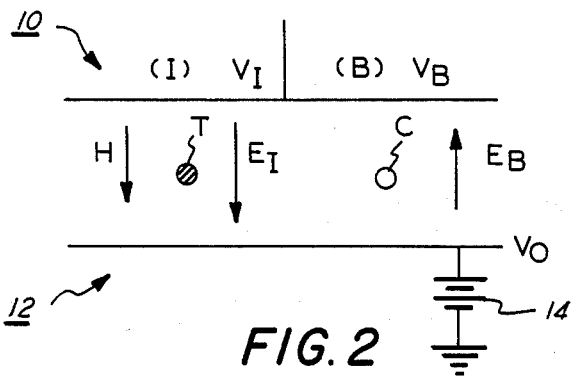
FIG. 2 is a schematic elevational view depicting the forces applied on the developer mixture.
Figure 3:
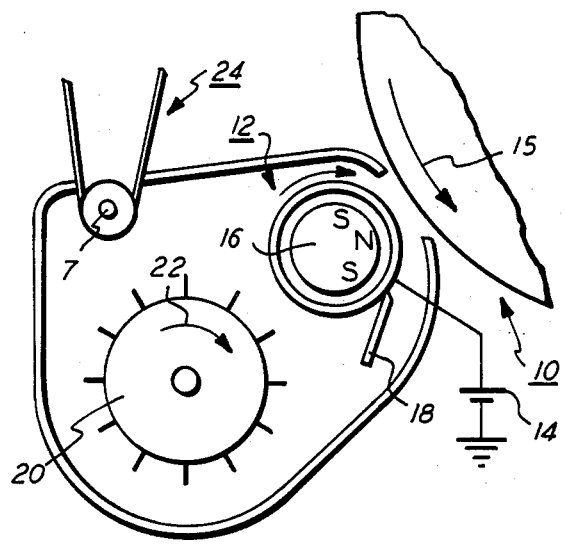
FIG. 3 is a schematic elevational view showing an illustrative development system using the developer mixture to develop an electrostatic latent image.

For a general understanding of the present invention, reference is had to the drawings. In the drawings, like reference numerals have been used throughout to designate identical elements. FIGS. 1 through 3, inclusive, depict the usage of the developer mixture in a development system for developing an electrostatic latent image recorded on a photoconductive member. It will become apparent that the features of the present invention may be utilized in other types of electrostatographic printing machines and are not necessarily limited in their application to the particular embodiment or methods of use described herein.

Inasmuch as the art of electrophotographic printing is well known, the various processing stations employed in a printing machine will be described briefly hereinafter.

An electrophotographic printing machine employs a photoconductive member, preferably a drum having a photoconductive surface disposed on a conductive layer. Preferably, the photoconductive surface is made from selenium with the conductive layer being made from an aluminum alloy. The drum rotates so as to advance successive portions of the photoconductive surface sequentially through the various processing stations disposed about the path of movement thereof.

Initially, a portion of the photoconductive surface passes through a charging station. At the charging station, a corona generating device charges the photoconductive surface to a relatively high substantially uniform potential.

Next, the charged portion of the photoconductive surface is advanced to an imaging station. At the imaging station, an original document is placed face down on a transparent platen. Lamps illuminate the original document disposed on the platen. The light rays reflected from the original document are transmitted through a lens. The lens forms a light image of the original document which is focused onto the charged portion of the photoconductive surface to selectively dissipate the charge thereon. This records an electrostatic latent image on the photoconductive surface which corresponds to the informational areas contained within the original document. It is clear that, on the photoconductive surface, the informational areas are regions of high charge with the background area being regions of lower charge.

After imaging, the drum advances the electrostatic latent image recorded on the photoconductive surface to the development station. At the development station, a magnetic brush developer roller advances the developer mixture into contact with the electrostatic latent image recorded on the photoconductive surface. Toner particles are deposited on the photoconductive surface in image configuration. The detailed manner of operation of a development apparatus using the developer mixture of the present invention will be described hereinafter with reference to FIGS. 1 through 3, inclusive.

Continuing with the description of the illustrative electrophotographic printing machine, after the toner powder image is developed on the photoconductive surface, the drum advances the toner powder image to the transfer station. At the transfer station, a copy sheet is moved into contact with the toner powder image. A corona generating device sprays ions onto the backside of the copy sheet. This attracts the toner powder image from the photoconductive surface to the copy sheet. After transfer, the copy sheet is advanced by a conveyor to a fusing station.

The fusing station includes a fuser assembly which permanently affixes the transferred toner powder image to the copy sheet. By way of example, the fuser assembly comprises a heated fuser roller and a backup roller. The toner powder image contacts the fuser roller. In this manner, the powder image is permanently affixed to the copy sheet. After fusing, the copy sheet is advanced to a tray for subsequent removal therefrom by the machine operator.

Invariably, after the copy sheet is separated from the photoconductive surface at the transfer station, some residual particles remain adhering thereto. These residual particles are removed from the photoconductive surface at the cleaning station. By way of example, the cleaning station may include a magnetic cleaning assembly which comprises a rotating sleeve having a stationary magnet disposed therein for attracting thereto residual magnetic particles adhering to the photoconductive surface. Subsequent to cleaning, a discharge lamp floods the photoconductive surface with light to dissipate any residual electrostatic charge remaining thereon prior to the charging thereof for the next successive imaging cycle.

It is believed that the foregoing description is sufficient for purposes of the present application to illustrate the general operation of an illustrative electrophotographic printing machine incorporating the features of the present invention therein.

Referring now to the specific subject matter of the present invention, FIG. 1 depicts a drum 10 having an electrostatic latent image recorded thereon and a developer roll 12 transporting developer material comprising carrier granules C and toner particles T thereto. As shown, the electrical force QE tends to attract the developer mixture deposited on the latent image toward roller 12. Electrical force QE is due to the charge on the individual carrier granules and toner particles and the intensity of the electrical field E between the developer roller and photoconductive surface. Hereinbefore, when the toner particles T were non-magnetic and the carrier granules C were magnetic, there tended to be an accumulation of toner particles which produced degradation of the developed image. This accumulation of developer material frequently occured when the magnet was rotating inside of a stationary cylindrical member. However, it also occured when the outer cylindrical or tubular member was rotating and the magnet was stationary. It is believed that this phenomena was due to the fact that the magnetic carrier granules C are corpuscular with the non-magnetic toner particles T being of substantially the same size. The electrical force produced by the electrical field tended to push the mixture toward the developer roller resulting in greater attachment of the toner particles thereto. This problem can be solved by utilizing the developer mixture of the present invention wherein the toner particles are weakly magnetically attractable and the carrier granules are strongly magnetically attractable with both the toner particles and carrier granules being of substantially the same size. Preferably, the amount of magnetic toner particles contained within the developer mixture is less than the amount of magnetic carrier granules.

Referring now to FIG. 2, a portion of the photoconductive drum and the developer roller are shown to exemplify the manner in which the requisite magnetic attraction of the toner particles and carrier granules is determined. As shown, photoconductive drum 10 has an electrostatic latent image recorded thereon having a voltage $V_I$. The background areas of the photoconductive drum have a voltage $V_B$. As shown, the image areas are designated by I and the background areas by B. Voltage source 14 electrically biases developer roller 12 to a voltage $V_0$. Developer roller 12 has a stationary magnet disposed interiorly thereof producing a magnetic field having a vertical magnetic component H. The intensity of the electrical field in the image areas is designated as $E_I$ with the intensity of the electrical field in the background area being designated as $E_B$. The electrical charge on the toner particles is negative and designated as $Q_T$ with the electrical charge on the carrier being positive and designated as $Q_C$. Inasmuch as $V_0$ is greater than $V_B$ the electrical field $E_B$ is in the direction shown by the arrow in FIG. 2. Similarly, inasmuch as the electrical voltage $V_I$ is greater than $V_0$, the electrical field $E_I$ is in the direction shown by the arrow in FIG. 2. Considering initially the magnetic attractability of the toner particles, the magnetic force exerted on the toner particles must be less than the electrical force applied thereon in the image area. Thus, the magnetic attractability, $M_T$, of the toner particles is:

$$Q_T E_I > M_T \mu H$$

$$M_T < Q_T E_I/(\mu H)$$

Turning now to the carrier granules, the electrical force in the background area must be less than the magnetic force applied on the carrier granules. Thus, the magnetic attractability, $M_C$, of the carrier granules is expressed as:

$$Q_C E_B < M_C \mu H$$

$$M_C > Q_C E_B/\mu H$$

Various types of binder materials may be chosen for the toner particles so that the toner particles and carrier granules are triboelectrically attracted to one another. The relative binder materials used on the carrier granules and magnetic toner particles may be the same or different so long as the appropriate triboelectric charge is induced therebetween. An electrical charging agent may also be employed to produce the requisite triboelectric charge. The particle diameter of the toner particles and carrier granules is substantially the same with the weight of the toner particles and carrier granules being almost equal. In this way, the carrier granules and toner particles may be readily mixed with one another. Preferably, the ratio of carrier granules to toner particles in the developer mix ranges from about 100:25 to about 1:1.

Turning now to FIG. 3, there is shown an exemplary development system which utilizes the developer mixture of the present invention to develop and electrostatic latent image recorded on a photoconductive surface. As shown, photoconductive drum 10 rotates in the direction of arrow 14. The developer roller includes a substantially tubular sleeve 12 having a magnet 16 with magnetic poles impressed thereon disposed interiorly thereof and spaced from the interior surface. As sleeve 12 rotates in the direction of the arrow, a portion of the developer mixture is advanced into contact with the latent image recorded on the photoconductive surface of drum 10. Voltage source 14 electrically biases sleeve 12 so that the toner particles are attracted to the latent image recorded on photoconductive drum 10. Metering blade 18 controls the quantity of developer mixture advanced by sleeve 12 into contact with the electrostatic latent image. Paddle wheel 20 rotating in the direction of arrow 22, mixes the developer mixture within the sump of the developer housing and advances this developer mix to sleeve 12. Toner container 24 houses a supply of toner particles. These toner particles are metered from container 24 by a rotating roller 26, which may be magnetic. In this way, the concentration of magnetic toner particles within the developer mixture is maintained at the desired level.

The developer mixture of the present invention prevents scattering of the toner particles during transportation of roller 12. Furthermore, the electrophotograhic printing machine can employ a magnetic cleaning system to remove the extraneous magnetic particles on the photoconductive surface after transfering the powder image to the copy sheet.

In recapitulation, the development system of an electrophotographic printing machine may employ the developer mixture of the present invention. This developer mixture comprises magnetic toner particles adhering triboelectrically to magnetic carrier granules. Both the toner particles and carrier granules are of substantially the same size. The carrier granules are more strongly magnetically attractable than the toner particles. In this way, development of an electrostatic latent image is significantly enhanced.

It is, therefore, evident that there has been provided in accordance with the present invention a developer mixture which fully satisfies the aims and advantages hereinbefore set forth. While this invention has been described in conjunction with a specific embodiment thereof, it is evident that many alternatives, modifications and variations will be apparent to those skilled in the art. Accordingly, it is intended to embrace all such alternatives, modifications and variations as fall within the spirit and broad scope of the appended claims.

What is claimed is:

1. A method of electrophotographic printing, including the steps of:
   recording electrically charged image and non-image regions on a photoconductive member;
   moving a magnetic developer mixture support to transport at least a portion of a developer mixture into contact with the photoconductive member with the developer mixture comprising at least magnetically attractable toner particles and magnetically attractable carrier granules adhering triboelectrically to one another and being of substantially the same size and weight with the carrier granules being more strongly magnetically attractable than the toner particles; and
   electrically biasing the developer mixture support so that the electrical force applied on the toner particles by the image region is greater than the magnetic force applied thereon and the electrical force applied on the carrier granules by the non-image region is less than the magnetic force applied thereon so that at least some of the toner particles are deposited on the image region forming a toner powder image thereon with the carrier granules remaining substantially on the developer mixture support.

2. A method according to claim 1, further including the steps of:

transferring the toner particles from the image region to a sheet of support material; and fixing the toner particles to the sheet of support material.

3. A method according to claims 1 or 2, wherein the toner particles are electrically insulating.

4. A method according to claim 3, wherein the ratio of carrier granules to toner particles present in the developer mixture ranges from about 100:25 to about 1:1.

* * * * *